O. CARLSON.
DUST PAN.
APPLICATION FILED APR. 17, 1914.
1,191,945.
Patented July 25, 1916.
2 SHEETS—SHEET 1.
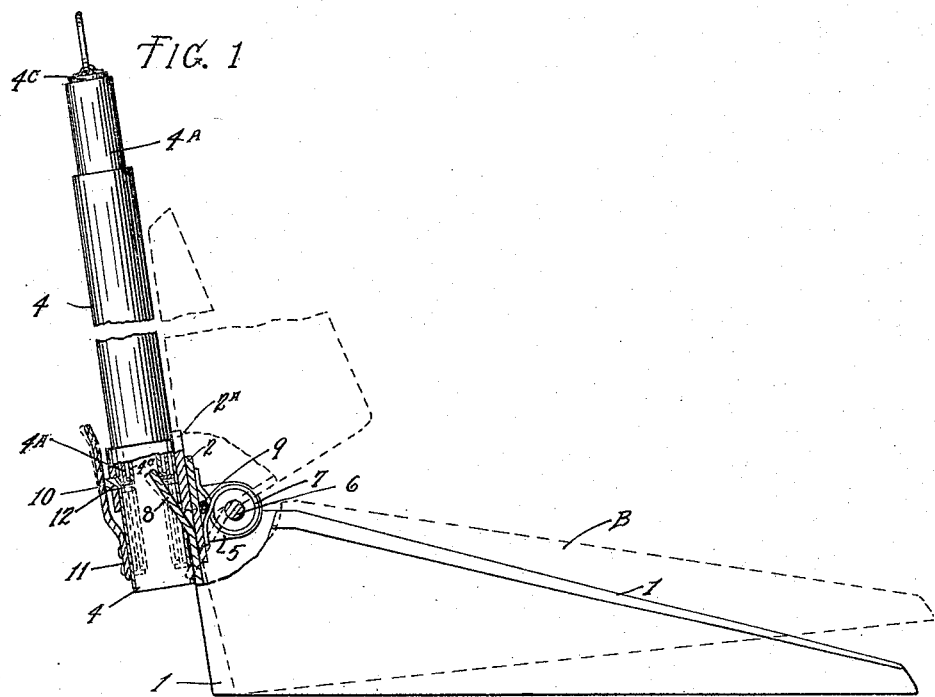
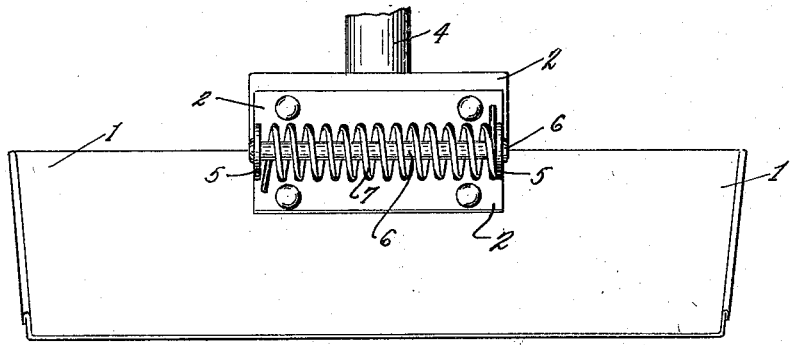
WITNESSES
Otto Melchior
Paul A. Niersen.
INVENTOR
O. Carlson
BY H. Sanders
ATTY.

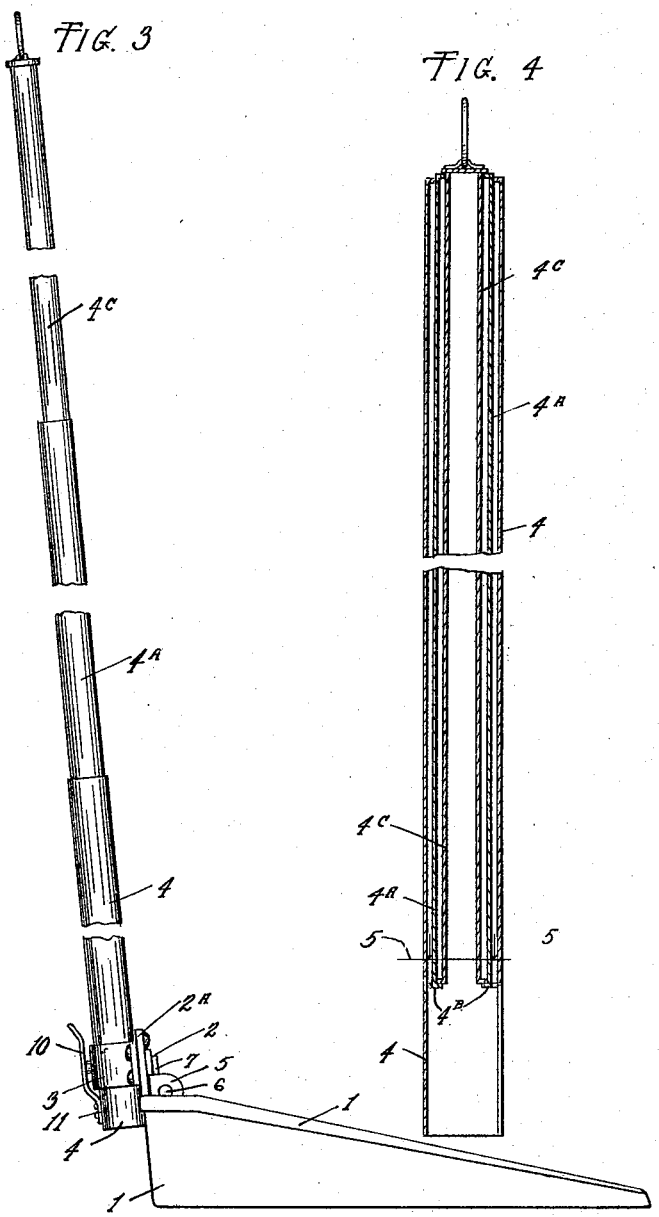

UNITED STATES PATENT OFFICE.

OTTO CARLSON, OF BERGLAND, MICHIGAN.

DUST-PAN.

1,191,945.  Specification of Letters Patent. Patented July 25, 1916.

Application filed April 17, 1914. Serial No. 832,440.

*To all whom it may concern:*

Be it known that I, OTTO CARLSON, a citizen of the United States, residing at Bergland, in the county of Ontonagon and State of Michigan, have invented certain new and useful Improvements in Dust-Pans, of which the following is a specification.

This invention relates to improvements in dust pans and its object is to produce a pan which may be used by a person in a standing position or in a stooped position.

Another object is to produce a dust pan which, when not in use, may be folded up.

Another object is to produce a dust pan which may be partly folded or collapsed in order that its contents may not spill, through gravitation, due to the angle of the pan with its handle.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a view, partly in section, of my improved dust pan. Fig. 2 is a front view of the same. Fig. 3 is a side elevation. Fig. 4 is a section through the handle. Fig. 5 is a section on line 5—5 of Fig. 4.

Like reference characters indicate corresponding parts throughout the several views.

The reference numeral 1 indicates a dust pan which is connected by a hinged plate 2 to a plate 2$^A$ to which is secured a strap 3 which encircles the handle 4 of the pan. The handle comprises three tubular longitudinally telescoping sections 4, 4$^A$, 4$^C$ which form, respectively, outer, intermediate and inner sections and which in extended relation permit the operator to assume an erect position while using the pan and when telescoped occupy but little space. The plate 2 is formed with ears 5, 5 in which a pin 6 is carried upon which a spring 7 is disposed that obtains a bearing upon each section of said plate to yieldingly retain the pan in operative position. The pan is formed with a projection or ear 8 that extends into the sectional telescoping handle and that is disposed in the path of the sections of said handle and that is engaged by them as they are telescoped and thereby said ears is caused to rotate the pan upon the hinge 9 of plate 2 into the position shown dotted at B in Fig. 1. To the lower section of the handle and directly opposite the pan 1 an angular resilient member 10 is secured as at 11 and said member is provided with a lug 12 that is projected through an aperture in the lowest handle section and disposed in the path of movement of the other handle sections. The handle section 4$^A$ is formed with a fluted end 4$^B$ upon which the bent end of the handle section 4$^C$ strikes as the handle is telescoped to insure uniform movement of the said sections. When the handle 4 is telescoped the telescoping sections will first encounter the ear 8 of the pan 1 and thereby move said pan with relation to the handle; the telescoping handle sections will next encounter the lug 12 of member 10 which will arrest the movement of said sections and also of pan 1 thus throwing the latter into the position shown dotted at B in Fig. 1. To fold the pan against the handle the member 10 may be manually moved away from the handle until the lug 12 is drawn out of the path of the telescoping handle sections when those sections may be completely telescoped which operation will move the pan into the position shown dotted in Fig. 1 or into inoperative position.

In using the dust pan the material from the floor is brushed upon it when it is in the position shown in full lines and when the pan is filled or the material all gathered the pan may be moved into the position shown dotted at B, Fig. 1, to prevent the material from dropping to the floor as the pan is moved to the receptacle into which it is to be emptied.

What is claimed is:—

1. The combination with a dust pan, of a telescoping handle hinged thereto, spring-connection between said handle and pan and an ear made integral with said pan and projected into said handle in the path of movement of the telescoping portions of said handle.

2. The combination with a dust pan, of a telescoping handle hinged thereto, spring-connection between said handle and pan, an ear made integral with said pan and projected into said handle in the path of movement of the telescoping portions of said handle and means associated with said handle and projected thereinto for limiting the movement of the telescoping portions thereof.

3. The combination with a dust pan, of a telescoping handle hinged thereto, spring-connection between said handle and pan, an ear made integral with said pan and projected into said handle in the path of movement of the telescoping portions of said handle, an angular resilient member secured to said handle and a lug carried by said member and removably projected into said handle for limiting the movement of the telescoping portions thereof.

In testimony that I claim the foregoing as my own I have hereto affixed my signature in the presence of two subscribing witnesses.

OTTO CARLSON.

Witnesses:
ERIC SKANTZ,
S. H. SHANKEY.

Copies of this patent may be obtained for five cents each, by addressing the "Commissioner of Patents, Washington, D. C."